United States Patent [19]
Bender

[11] Patent Number: 4,916,712
[45] Date of Patent: Apr. 10, 1990

[54] OPTICALLY PUMPED SLAB LASER

[75] Inventor: Gerald M. Bender, Marthasville, Mo.

[73] Assignee: McDonnell Douglas Corporation, St. Louis, Mo.

[21] Appl. No.: 385,419

[22] Filed: Jul. 27, 1989

[51] Int. Cl.$^4$ .............................................. H01S 3/091
[52] U.S. Cl. .......................................... 372/75; 372/93; 372/100
[58] Field of Search ........................ 372/69, 75, 92, 93, 372/99, 100

[56] References Cited
U.S. PATENT DOCUMENTS

| | | | |
|---|---|---|---|
| 3,393,954 | 7/1968 | Enderby et al. | 372/100 |
| 4,204,175 | 5/1980 | Baldwin et al. | 372/100 |
| 4,837,771 | 6/1989 | Baer | 372/75 |

Primary Examiner—William L. Sikes
Assistant Examiner—B. R. R. Holloway
Attorney, Agent, or Firm—Benjamin Hudson, Jr.; George W. Finch; John P. Scholl

[57] ABSTRACT

There is provided an optically pumped laser having highly reflective coatings on opposite sides such that multiple reflections of radiation between the reflective coatings of the opposed sides produce lasing in a transverse mode. A plurality of diode lasers mounted in a linear array along the opposed sides with reflective coatings provide pumping emission to the laser. An optical alignment means consisting of prisms receive the stimulating emission from individual diode lasers and align individual stimulating emission such that it is co-linear with the reflective radiation within the laser cavity.

6 Claims, 1 Drawing Sheet

OPTICALLY PUMPED SLAB LASER

BACKGROUND OF THE INVENTION

1. Field of the Invention

This invention is related generally to laser devices and more particularly to laser devices that are optically pumped by semiconductor laser diode means.

2. Brief Description of the Prior Art

Traditionally solid optically pumped lasers consist of a solid material wherein the optical gain in the material is generated by stimulated emission. The laser rod is normally optically pumped by a flash lamp or an arc lamp. Since most of the energy in these lamps is converted into heat, the flash lamp or arc lamp as a pumping medium is generally inefficient and the heat generated can sometimes damage the laser rod.

In an effort to develop more efficient solid state lasers which generate higher output power and have a longer life time, designers have begun to use lateral pumping means such as solid state laser diode arrays that are mounted on the side of a laser slab to be pumped to match the $TEM_{00}$ mode volume defined by the laser cavity. Such a device has been disclosed in U.S. Pat. No. 4,785,459 issued to Thomas M. Baer, on Nov. 15, 1988 which illustrates a solid state laser array as a pumping medium to match a zig-zag cavity resonance at a pre-selected fold angle between the lateral sides of the solid state laser. In this patent the divergence of the laser diode emissions is matched to the fold angle of the zig-zag path of the $TEM_{00}$ beam through the block of the solid state laser material.

SUMMARY OF THE INVENTION

There is provided by this invention is a transverse mode diode pumped solid laser that utilizes optical waveguides, collimating lenses, and prisms to receive the pumping output of individual diodes in a diode array to precisely match the individual output of a diode such that it is colinear with the reflected beam angle of the transverse resonant mode within the laser cavity. Each individual diode pump beam is coincident with the laser beam in the crystal.

BRIEF DESCRIPTION OF THE PREFERRED EMBODIMENT

Figure 1:
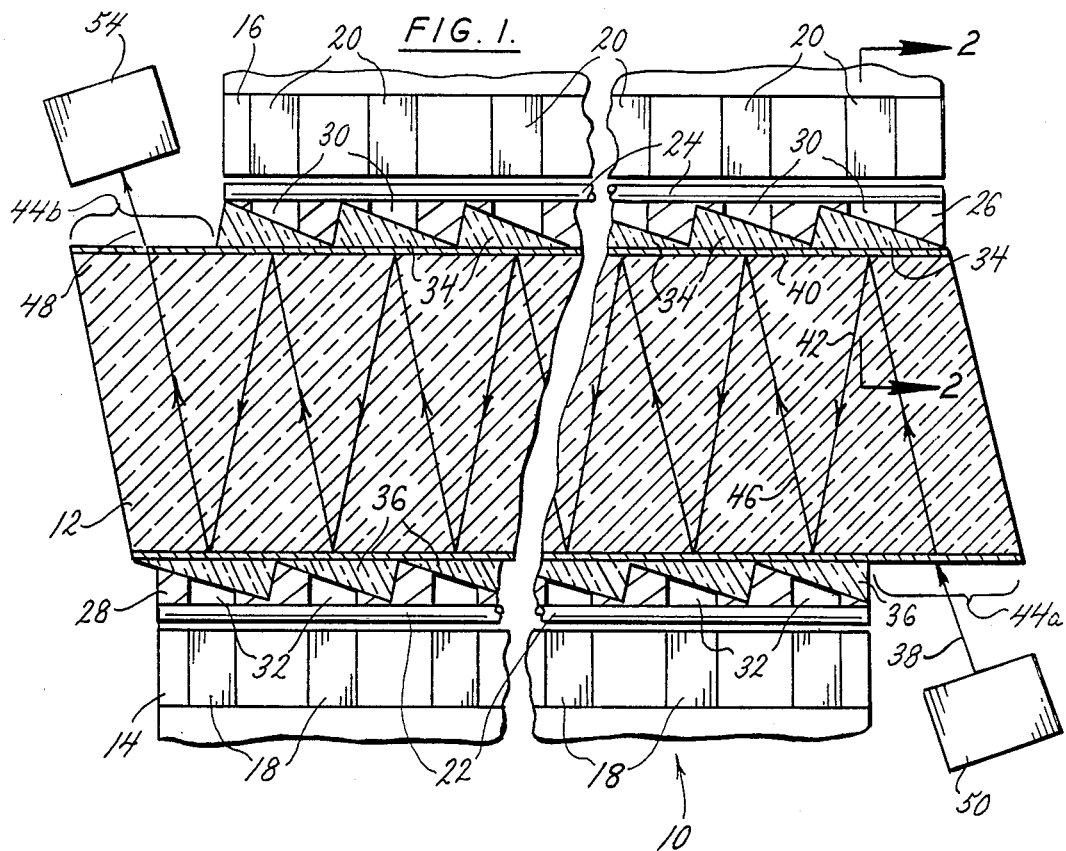
FIG. 1 illustrates a slab laser having a lateral pumping scheme by a semiconductor diode array incorporating the principles of this invention.
Figure 2:
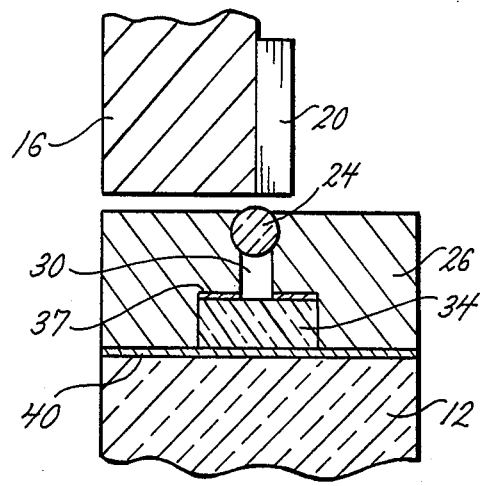
FIG. 2 is an exploded view taken along the lines 2—2 of FIG. 1 incorporating the principles of this invention.

Referring to FIG. 1, there is shown a solid state laser generally at 10 that incorporates the principles of this invention. The laser is generally comprised of a block of ionic laser material 12 that could be any of several either materials, for example, Nd:YAG or Nd:YAP. The laser slab 12 is pumped with two diode arrays bars 14 and 16. Each array bar has individual laser diodes such as 18 and 20 that provide pump beams that are coincident with the laser emission in the crystal in a manner that will be described hereinafter. The light output from the individual diodes such as 18 and 20 is collimated by cylindrical lenses 22 and 24. A supports or spacers 26 and 28 support the cylindrical lens 22 and 24 and has openings or apetures 30 and 32 therein that functions as an optical waveguide to direct the collimated light from the cylindrical lens 24 into a prism such as 34 or 36. The support structures 26 and 28 have cylindrical reflecting surface such as 37, shown in FIG. 2, which recycles the pump light which is not absorbed in the slab and returns it along the path by which it came. This allows the structure to return pump power that would otherwise be wasted. The prisms are cemented or otherwise connected to the slab to redirect the light beams from the individual diodes along one leg of the reflecting laser beam within the slab.

The circulating power or mode of the laser resonator is provided by light beam 38 which enters the laser material at a predetermined angle to control the number of bounces within the laser slab. Region 44a of the slab 12 is an anti-reflecting zone of the slab coating where the light beam 38 enters the slab. Also at 44b an anti-reflection zone of the slab coating is provided where the light beam 48 exits the slab. The input beam is first reflected from the opposite side of the laser slab 40 which has a high reflection coating for the wavelength of the laser mode, but the coating must be anti-reflecting for the wavelength of the laser pumping diodes. The first reflected beam 42 within the material is comprised of the incident beam 38 and the output from the individual laser diode 20 that is redirected by the prism 34 such that the diode output is coincident with the reflected beam. The opposite side of the laser slab 40 also has a high reflecting coating such the next reflected beam such as 46 is reflected back to the other side 40 of the laser slab. This process repeats throughout the laser slab length such that a lateral reflecting pattern is formed along the laser resonating cavity. With each reflection within the material a prism such as 34 and 36 on the opposite sides of the laser slab redirects the output from the individual laser diodes in laser diode arrays 14 and 16 such that the outputs of the individual diodes are coincident with the reflected light beam at the bounced points of the cavity. Consequently, when the light outputs 48 exits the material it is comprised of an amplified laser output as a result of the pumping power supplied by the individual diodes in the diode arrays mounted on the lateral sides of the slab. Mirrors 50 and 54 form the ends of the resonating cavity and set the angle of incidence of the beam 42 to control the number of reflections in the material for the transverse mode of resonation. These mirrors have reflective and partially reflective characteristics to sustain oscillation in the cavity in a manner well known in the art.

This design is used to produce a high output laser that is adaptable to continuous wave communication applications which has a high laser efficiency. The following are the design specifications for the preferred embodiment of a laser incorporating the principles of this invention.

| COMMUNICATIONS LASER DESIGN SPECIFICATIONS | |
|---|---|
| SLAB THICKNESS | 2 mm |
| SLAB LENGTH | 13 mm |
| NUMBER OF BOUNCES | 28 |
| MODE WAIST RADIUS | 180u |
| PEAK CIRCULATING FLUX DENSITY | 133 W/mm$^2$ |
| OUTPUT COUPLER TRANSMISSION | 25% |
| SLAB FACE REFLECTIVITY | .9998 |
| DIODE WIDTH | 300u |
| POWER PER DIODE | 250 mW |
| DIODE OVER CENTER SPACING | 800u |
| BAR LENGTH | 12 mm |

Although there has been illustrated and described specific detail and structure of operations, it is clearly understood that the same were merely for purposes of illustrations and that changes and modifications may be readily made therein by those skilled in the art without departing from the spirit and the scope of this invention.

I claim:

1. A solid optically pumped laser comprising:
   (a) a solid ionic material positioned between at least two mirrors forming a resonator wherein spontaneous emission in the material is amplified by stimulated emission;
   (b) the ionic material having a highly reflective coating on opposed sides;
   (c) the mirrors mounted such that a resonating cavity is formed in the ionic material wherein the emission consists of multiple reflections of radiation between the reflective coatings of the opposed sides producing lasing in a transverse mode;
   (d) a plurality of optical pumping means mounted in a linear array along the opposed sides with reflective coatings for providing pumping emission to the material; and
   (e) optical alignment means for receiving the stimulating emission from individual optical pumping means and aligning individual stimulating emission such that it is colinear with the reflective radiation within the cavity.

2. A solid optically pumped laser as recited in claim 1 wherein the plurality of optical pumping means is comprised of a block of solid state laser diodes forming a laser diode array.

3. A solid optically pumped laser as recited in claim 1 wherein opticl alignment means for receiving the stimulating emission from individual optical pumping means is comprised of a cylindrical lens for collimating the output of the individual pumping means and a prism for aligning the collimated output such that it is colinear with the reflective radiation within the laser material.

4. A solid optically pumped laser as recited in claim 3 wherein the plurality of optical pumping means is comprised of a block of solid state laser diodes forming a laser diode array.

5. A solid optically pumped laser as recited in claim 3 wherein an optical waveguide is positioned between the collimating lense and the prism to direct the collimated output to the prism.

6. A solid optically pumped laser as recited in claim 3 wherein a reflecting surface is in close proximity to the solid ionic material wherein the pumping emission that is not absorbed by the ionic material is reflected back into the material to prevent wasted energy.

* * * * *